Figure 1:
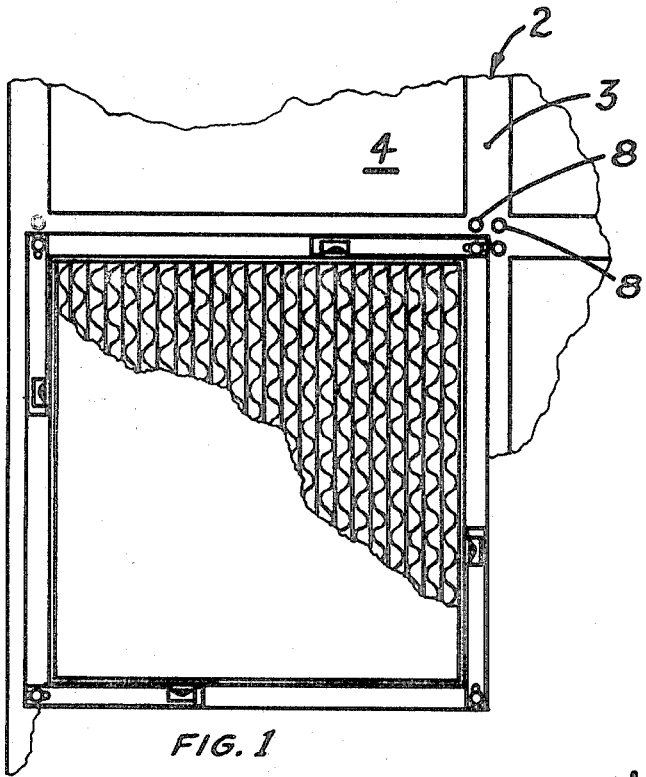

United States Patent

[11] 3,576,096

| | | |
|---|---|---|
| [72] | Inventor | Richard D. Rivers<br>Louisville, Ky. |
| [21] | Appl. No. | 834,806 |
| [22] | Filed | June 19, 1969 |
| [45] | Patented | Apr. 27, 1971 |
| [73] | Assignee | American Air Filter Company, Inc.<br>Louisville, Ky. |

[54] FILTER FRAME LATCHING ASSEMBLY
3 Claims, 2 Drawing Figs.

[52] U.S. Cl................................................... 55/504,
55/507, 55/521, 292/91
[51] Int. Cl................................................. B01d 25/00
[50] Field of Search........................................ 55/482-
—484, 490, 493, 494, 502, 504, 505—507, 511,
521; 52/476, 499; 49/465, 463; 217/53, 54;
248/229, 361; 292/80, 81, 87, 91, 303, 258, 288

[56] References Cited
UNITED STATES PATENTS

| | | | |
|---|---|---|---|
| 1,204,963 | 11/1916 | Ekman.......................... | 292/87 |
| 2,016,033 | 10/1935 | Christofferson.............. | 55/484 |
| 2,592,452 | 4/1952 | Moore........................... | 292/87 |
| 2,631,340 | 3/1953 | Decker.......................... | 52/476 |
| 3,100,557 | 8/1963 | Getzin........................... | 55/490 |

FOREIGN PATENTS

| | | | |
|---|---|---|---|
| 998,032 | 7/1965 | Great Britain................ | 55/490 |

*Primary Examiner*—Frank W. Lutter
*Assistant Examiner*—Bernard Nozick
*Attorney*—Ralph B. Brick ABSTRACT: A filter frame latching assembly to fasten the marginal sealing edge of an open end flow-through filter frame to the marginal sealing edge of an open end support frame including a plurality of bite post members extending from the sealing edge of the support frame through aligned apertures in the sealing edge of the filter frame, the bite posts being engaged by longitudinal fastening bars extending between the bite posts and stop members mounted in the sidewalls of a filter frame.

PATENTED APR 27 1971

3,576,096

INVENTOR
Richard D. Rivers

BY Ralph B. Brick
ATTORNEY

FILTER FRAME LATCHING ASSEMBLY

BACKGROUND OF THE INVENTION

The present invention relates to gas separators, and more particularly, relates to a new and useful latching assembly for fastening filter frames to support frame structure.

Various arrangements are known in the filtering art for fastening a filter frame to its support structure. Many of these arrangements are complex in construction and operation, requiring considerable space for mounting and fastening, and presenting problems in access and maintenance.

SUMMARY OF THE INVENTION

In accordance with the present invention, a latching assembly is provided for a filter frame and support frame which is straightforward and economical in construction and operation, permitting rapid installation and removal, and fastening and unfastening, with a minimum of steps and a minimum of space required.

Various other features of the present invention will become obvious to one skilled in the art upon reading the disclosure set forth herein.

More particularly, the present invention provides a filtering assembly comprising: a flow-through open end support frame having a marginal sealing flange therealong; an aligned flow-through open end filter frame having an outwardly extending flange member sized to engage in sealed relationship with said marginal sealing flange of the support frame; and a latching assembly to fasten the filter frame to the support frame, the latching assembly including a plurality of bite posts mounted in spaced relation along the sealing flange of the support frame to extend outwardly therefrom; a plurality of apertures in the flange member of the sealing frame, the apertures being spaced and sized to permit passage of the bite posts therethrough; a plurality of stop members mounted in spaced relation along the sides of the filter frame and extending therefrom in preselected relation to the bite posts; and longitudinally extending lever bar members extending between the bite posts and the stop members to engage in urging relationship against the sealing flange of the support frame.

It is to be understood that various changes can be made in the arrangement, form, and construction of the apparatus disclosed herein without departing from the scope or spirit of the present invention.

Figure 2:
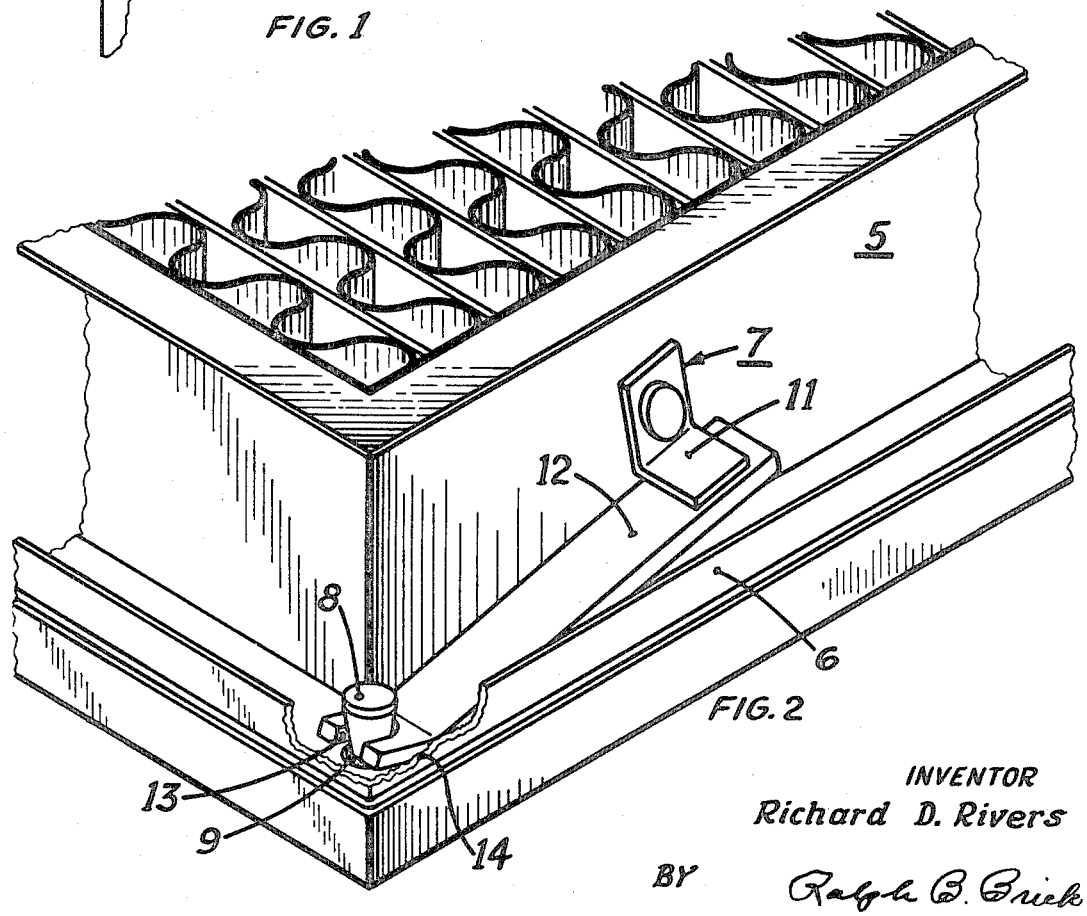

Referring to the drawing which discloses one advantageous embodiment of the present invention:

FIG. 1 is a vertical partial view of an open end support frame with an open end filter frame mounted thereon by a latch assembly in accordance with the present invention; and FIG. 2 is an enlarged view of a portion of the apparatus of FIG. 1, showing details of the latching assembly at one corner of a filter frame.

As can be seen in the drawing, an open end support frame 2 is provided having marginal sealing flanges 3 therealong. Aligned with the openings 4 in support frame 2 are provided a plurality of flow-through filter media containing open end filter frames 5. Each of these frames has an outwardly extending flange member 6 sized to engage in sealed relationship with marginal sealing flanges 3 of support frame 2. It is to be understood that frames 5 can contain any one of a number of filter mediums known in the art and that the frames can be formed from any one of a number of suitable materials such as wood or aluminum.

To mount filter frames 5 to support frame 2, suitable latching assemblies such as that broadly designated by reference numeral 7 in FIG. 2 is disclosed. Latching assembly 7 includes a plurality of bite posts 8 which are mounted in spaced relation along sealing flanges 3 of support frame 2, advantageously at the corners of the openings therein. Bite posts 8, as disclosed, are fastened to frame 2 to extend in a normal outwardly tapered direction from the plane of sealing flanges 3.

Positioned at the corners of sealing flange 6 of filter frame 5 are apertures 9, these apertures sized and aligned with bite posts 8 on flange 3 to permit passage of the bite posts therethrough during assembly operations.

Fixed to the sidewalls of frame 5 at positions spaced from the corners and from the sealing flange 6 of frame 5 are suitable right-angle stop members 11. Arranged to extend between each bite post 8 on support frame 2 and the projecting leg of the corresponding spaced stop 11 on filter frame 5 is a flexible lever bar member 12. Lever bar member 12 has one extremity thereof slotted as at 13, the slot engaging with tapered bite post 8. The other extremity is arranged to engage with stop member 11. As will be noted in FIG. 2, the longitudinal axis of lever bar member 12 forms an angle with the apex 14 of the angle serving to urgingly engage against the marginal flange 6 of the filter frame 5. Thus, when such lever bar is properly positioned, it will urge against the edge to hold it in sealed relation against sealing flange 3 of support frame 2. In this connection, it will be obvious that lever bar member 12 necessarily has to be of suitably flexible material to accomplish the desired resilient urging against the marginal edge of filter frame 5.

With the apparatus aforedescribed, to assemble frames 5 to support frame 2, it is a simple matter of aligning the apertures 9 in frame 5 with the bite posts 8 on support frame 2. The frame 5 then is positioned so that sealing edge 6 thereof engages against sealing edge 3 of support frame 2, with the bite posts 8 extending through apertures 9. Once this is accomplished, it only is necessary to insert four longitudinally extending lever bars 12 with their slotted extremities 13 engaging bite posts 8 and the opposite extremities abutting stops 11 so that the apices 14 urge against sealing edge 6.

I claim:

1. A filter assembly comprising a flow-through open end support frame having a marginal sealing flange therealong; an aligned flow-through open end filter frame having an outwardly extending flange member sized to engage in sealed relationship with said marginal sealing flange of said support frame; and a latching assembly to fasten said filter frame to said support frame, said latching assembly including a plurality of bite posts mounted in spaced relation along the sealing flange of said support frame to have their longitudinal axes extend normally outwardly therefrom; a plurality of apertures in said flange member of said filter frame, said apertures being sized and spaced to permit free passage of said bite posts therethrough; a plurality of stop members mounted in spaced relation along the sides of said filter frame and extending therefrom in preselected relation to said bite posts; and longitudinally extending flexible and removable lever bar members extending between said bite posts and said stop members, each of said lever bar members being contoured to engage in abutting relation at one portion thereof with one of said bite posts, at a second portion in abutting relation with one of said stop members and at a third portion in urging relationship against the sealing flange of said filter frame to hold said sealing flange of said filter frame in sealed relation against the sealing flange of said support frame.

2. The apparatus of claim 1, said bite posts each tapering outwardly from said sealing flange of said support frame and said lever bars each having an angular longitudinal axis with one extremity thereof slotted, said bar being so sized that the slotted extremity grips said tapered bite bar and the other extremity engages against one of said stop members with the apex of said bite bar engaging in urging relation against said sealing flange of said support frame.

3. The apparatus of claim 1, said bite posts being positioned at the corners of said sealing flange of said support frame.